Feb. 12, 1935. J. G. CAPSTAFF 1,991,136

PHOTOGRAPHIC EMULSION AND METHOD OF MAKING SAME

Original Filed July 5, 1923

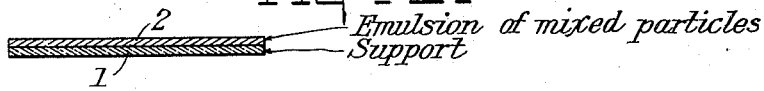

FIG_1_
— Emulsion of mixed particles
— Support

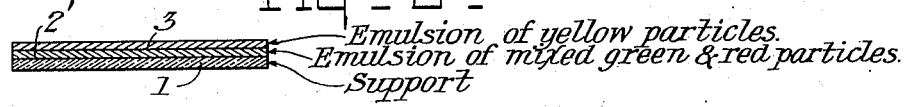

FIG_2_
— Emulsion of yellow particles.
— Emulsion of mixed green & red particles.
— Support

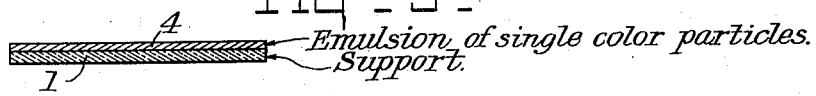

FIG_3_
— Emulsion of single color particles.
— Support.

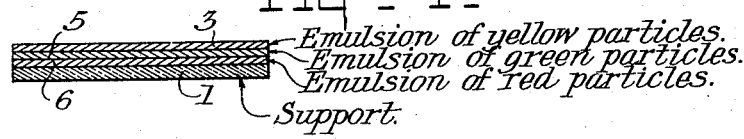

FIG_4_
— Emulsion of yellow particles.
— Emulsion of green particles.
— Emulsion of red particles.
— Support.

*Inventor,*
*John G. Capstaff,*
*By R. L. Stuictfield*
*N. M. Perrin*
*Attorneys.*

Patented Feb. 12, 1935

1,991,136

UNITED STATES PATENT OFFICE 1,991,136

PHOTOGRAPHIC EMULSION AND METHOD OF MAKING SAME

John G. Capstaff, Rochester, N. Y., assignor to Eastman Kodak Company, Rochester, N. Y., a corporation of New York Application July 5, 1923, Serial No. 649,729
Renewed October 30, 1928

7 Claims. (Cl. 95—2)

This invention relates to materials and methods useful in color photography. Its object is the provision of a direct method whereby a suitably prepared material will record automatically and without differential color treatment by the operator, the colors of a light image impressed thereon.

Such a material may comprise a sensitive emulsion or layer in which are incorporated particles which are selectively light sensitive to light of certain wave lengths and which may be developed or treated to yield images corresponding or complementary to the color of the light by which they are affected.

The method will first be briefly outlined and then more fully stated step by step.

A. There will first be prepared particles which will consist of light sensitive silver salts with adsorbed, mordanted dye. The colored particles will each be predominantly sensitive to light of the color they absorb. The number of colored salts may be varied but there will preferably be three as follows:

A1. Blue-green, sensitive to red light.
A2. Magenta, sensitive to green light.
A3. Yellow, sensitive to blue-violet light.

B. An emulsion of these three kinds of particles will be made and coated on a suitable support.

C. The coated emulsion will be ripened.

D. The coated emulsion will be exposed to a light image, either in a camera or by a printing process.

E. The exposed emulsion will be developed. The light affected particles will be transformed into silver particles to which the color still adheres. There will now be in the emulsion an image in colored silver particles which will be negative as regards both color and shade; and an image in colored silver salt particles which will be positive as regards both color and shade.

F. One of the images will be removed, leaving (F1) A positive or (F2) a negative. If a negative is obtained, a positive could be made therefrom by repeating the process.

Having thus outlined the process, it will now be more fully described, reference being made, where necessary, to the accompanying four figures, which show on a magnified scale, sections of photographic plates embodying various forms of my invention.

A. To obtain the several differentially sensitized particles, 50 cc. of 20% silver nitrate solution is first dissolved in a gelatine solution, the strength of which is comparatively immaterial but is preferably 6 grams of gelatin to 20 cc. of water, and to this is slowly added 100 cc. of solution of the dye to be used, with vigorous stirring. The proportion of the dye to the silver nitrate may vary but there must be no excess of dye, that is, no more dye must be used than will be adsorbed to the final silver salt.

There is then slowly added a soluble iodide, for example, 110 cc. of a 10% solution of potassium iodide. An excess of iodide over what is theoretically necessary is desirable to insure strong adsorption of the dye. This results in the precipitation in the gelatine of dyed silver iodide grains.

The dyed emulsion is now chilled, shredded and washed free of the soluble salts in the usual way. No trace of dye should wash out of the emulsion. The temperature should be kept low until the excess of soluble salts is washed out, as the dye tends to bleed at high temperatures.

As stated above the proportion of dye to nitrate may vary, but it has been my experience that for any particular dye there is a proportion, less than the maximum that will be adsorbed, that produces the best color sensitiveness. There must also be enough dye adsorbed so that the color remaining after the process is completed will have sufficient depth to give the full color rendering.

The following dyes are given as illustrative: A1, green dye, sensitizing for red: Brilliant green or Malachite green; A2, magenta dye sensitizing for green, basic Rhodamin; Rhodamin B G Badische; Rhodamin 6 G Hoechst. A3, yellow dye sensitizing for blue-violet, Auramin, or other suitable basic yellow dye.

While these dyes may be used, I have found their iodides to be in every way more satisfactory. Accordingly the dye solutions referred to above are made up from these. The strength of the dye solution will, of course, vary with the dye used, for instance, in using auramin, 1 gram of dye is dissolved in 100 cc. of water and 25 cc. of ethyl alcohol, and with most dyes the strength of the solution is of the same order. There are thus formed three emulsions of a gelatine carrier with dyed silver iodide grains.

B. These three emulsions are then separately redissolved, and thoroughly mixed, and the mixture coated on a suitable support such as a transparent plate or film, or on paper, and referred to hereinafter as a plate. In Fig. 1 the support is indicated as 1 and the emulsion as 2. The number of particles of the different colored salts must be so proportioned and their relative sensitiveness such that correct color rendering will be given for all combinations of color. Since the sensitivity and depth of color of the dyes are different, this can be determined only by experiment. One criterion is that it should appear black or at least neutral in color. In the final emulsion, I find it desirable that a 10% gelatin solution be used. As noted, it is possible in obtaining the several separate emulsions to vary the proportions of water and gelatin, but such variations must be compensated for when the final emulsion is made to bring it to the desired strength.

C. The emulsion may be ripened, as usual, before use, but the extent of this depends on the character of the emulsion and the use intended. If a printing process is contemplated, where speed is not essential, ripening may be omitted.

A silver iodide emulsion, however, is not generally readily developable: I have discovered that if plates coated with iodide emulsion are, before exposure, bathed in an alkali bath and dried they are rendered developable. For this purpose I use a .1% solution of sodium hydroxid.

D. The plate is then exposed in any suitable photographic apparatus, camera, projector or printing machine to a colored light image.

E. The plate is then developed. I use customarily one of the type known as "M—Q", containing monomethyl paramidophenolsulfate and hydroquinone, such as are in general use, no particular formula being found predominantly superior. The plate is then rinsed. I have found that submission to a developing bath and rinse, totalling in all fifteen to thirty minutes, does not affect appreciably the dyes, but that the latter remain associated with the silver particles developed from the exposed iodide particles. There are, therefore, at this time present in the emulsion layer two images, one of dyed silver particles, and one of dyed silver iodide particles. The silver image is, of course, negative as regards light and shade; and, since the particles affected are those complementary in color to that of the incident light, it is also negative as regards color. The dyed silver iodide particles, being those unaffected, are positive both as regards color and as regards light and shade.

F. There are now two broad methods of procedure depending on which of the two images is to be retained.

(F1) If a direct positive is desired, I dissolve out the silver image with a suitable photographic reducer that does not attack the silver salt nor the dye adsorbed thereto, such as chromic acid. This does not at once remove the dye associated with the silver, which is now released, but this dye can be washed out of the gelatin by thorough washing. There is then left a positive dyed silver iodide image. The unripened iodide is stable to light, and is of fine grain. The image is sufficiently transparent, so that no further treatment is required.

(F2) If a negative image is desired, the dyed silver iodide image is removed in a plain "hypo" bath, and the plate is then washed to remove the dye released from the iodide. The remaining dyed silver image is too opaque to be entirely satisfactory and the silver is, therefore, removed. This may be done by chromic acid as before, and the plate is then preferably submitted at once to a bath, as of phosphor tungstic acid, that mordants the dye in situ. To make a positive the entire process is then repeated, printing from the negative thus made.

Having now outlined a preferred process, I will mentioned certain modifications that are of use.

In step A, instead of obtaining a silver iodide, a silver bromide may be obtained. As before, silver nitrate is added to a gelatin solution, but in this case as little gelatin as possible is used, and the dye is added. There is then added a ferrocyanide or a ferricyanide of potassium, sodium or ammonium. I customarily use one of the potassium salts known respectively as the yellow and red potassium prussiates. This is added in excess of the quantity necessary to form the corresponding silver salt. There is then added an alkali bromide, ammonium bromide, for instance, in excess, with just enough of an alkali such as potassium hydroxid to render the mass alkaline. Silver bromide is precipitated. The bromide and ferricyanide or ferrocyanide may be added at the same time instead of in two steps. I have found that silver bromide formed in this way is dyed more heavily and the adsorption of the dye is more stable than when the bromide alone is added directly to the nitrate solution. I have also discovered that during the precipitation of the bromide salt, a light, such as a mercury arc, may be used, and that the resulting emulsion has a greatly increased sensitivity, this being true whether or not the salt is selectively color sensitized. In this latter case the light may be of the color to which it is to be predominantly sensitive. Such light may be used only during precipitation of the silver bromide.

A further modification of my process consists in the employment, instead of the dyes mentioned or their iodides, of the leuco bases of these dyes. In this case step A is carried out in substantially the manner outlined, the leuco base of the dye being used instead of the dye itself. This leuco base, while itself substantially colorless, when oxidized yields a colored dye. In such a case it may be desirable to use the leuco base principally as the color-yielding dye, and to use with it another dye, not color-yielding in the final stage, for color sensitizing: for instance, erythrosine and the lueco base of basic Rhodamin may be mixed in the dye solution (step A2), the erythrosine being useful here principally in selectively color sensitizing the salt, and the leuco base being useful principally in forming the final dye image. The leuco base is particularly recommended with silver iodide as the sensitive salt.

The steps B, C and D would then be performed as above. During development, (step D) the leuco bases associated with those grains which are developed into silver are oxidized into their corresponding colored dyes, while those associated with the undeveloped grains are not affected. There would then be in the emulsion layer a negative silver image with a negative dye image and a positive silver salt image, associated with which is a leuco base image.

A positive may then be made (step F1) in the same way as above outlined, the oxidizing agent such as chromic acid simultaneously removing the silver image and oxidizing the leuco base adsorbed to the silver iodide to the dye which remains adsorbed to the salt, and the dye formerly associated with the silver is liberated and washed out.

The green and red dyed particles have considerable blue sensitiveness which in a theoretically accurate process would be undesirable. There are several ways in which this predominance to blue may be lessened. One way is the making of a mixed emulsion of the green and red dyed particles only and coating this on a support, with the yellow dyed particles in a separarate upper coating which acts as a screen. This is shown in Fig. 2, where the support is indicated as 1, the mixed emulsion as 2' and the emulsion of yellow dyed particles as 3.

The sensitiveness of the individual red and green dyed particles may also be reduced in the following manner. After the green and red dyed emulsion of silver iodide, for instance, have been formed, and before they have mixed into a compound emulsion, they are separately bathed in a yellow acid dye, such as acid yellow or tartrazine. Since the adsorbed dyes are basic, they will act to precipitate the yellow dye upon the particles as a coating, which will have no color sensitizing effect but which acts as a screen for blue light. There will then exist the individual particles inherently sensitive to red or green, and also to blue, but individually screened against blue. The yellow dye will be removed in the photographic baths.

Other methods of treatment corresponding to step F2 and yielding a negative will now be described. In this case the exposure is preferably made through the support which is transparent and after development is bathed in a bleaching bath, such as Potassium bichromate_____10 grams
Potassium bromide_____ 10 grams
Water _____ 1000 cc.

which converts the silver to silver bromide and tans the gelatin. The plate is then washed in hot water removing the unaffected gelatin and leaving a negative image. If the developer used is one that tans, such as certain well known pyro developers, the washing off may take place at once. If the support is opaque, the emulsion layer must first be transferred in the well known manner.

The single color emulsions may also be coated as single layers without mixing, and will produce monochrome images, particularly by the wash-off process as described. Such a plate is shown in Fig. 3, the support being indicated as 1, and the emulsion as 4. Several of these monochrome images may be combined to produce a multicolor image. Several successive coatings, each of a single color emulsion, may be made on a support, and the manipulation will be the same as with the mixed emulsion. The resulting color images will then be in separate layers instead of mixed. In this case the yellow, blue sensitive layer will be on top for the screening action. Such a plate is shown in Fig. 4, where the support as indicated at 1, has successively coated thereon the emulsion layer 6 of red dyed particles, emulsion layer 5 of green dyed particles, and emulsion layer 3 of yellow dyed particles.

The usual commercial names of the dyes are used in the above specification. Their chemical constitution is indicated in the following list:

Brilliant green___ Sulphate of tetraethyldiamido-triphenyl carbinol.
Malachite green__ Zinc-double-chloride of tetramethyl di - p - amidotriphenyl carbinol.
Basic Rhodamin_ Hydrochloride of diethyl-m-amidophenol phthaleine.
Rhodamin B. G.___ Triethyl rhodamine.
Rhodamin 6-G____ Ethyl ether of sym. diethyl rhodamine.
Auramin _____ Hydrochloride of imido-tetramethyl diamido - diphenyl methane.
Acid yellow_____ Amido azobenzenedisulphonate.
Tartrazine_____ Sodium salt of benzene-azo-pyrazalone carboxyldisulphonic acid.

It is obvious that numerous variations of this process are possible and I contemplate as within the scope of my invention all such modifications and equivalents as fall within the terms of the appended claims.

Having thus described my invention, what I claim as new and desire to secure by Letters Patent is:

1. The method of making a photographic emulsion that comprises the mixing in a gelatine solution of silver nitrate and a basic dye, and the addition thereto in excess of a prussiate of an alkali metal and of a bromide of an alkali metal, whereby the silver bromide is formed with the dye adsorbed thereto.

2. The method of making a photographic emulsion that comprises the mixing in a gelatine solution of silver nitrate and a basic dye, and the addition thereto in excess of a potassium prussiate and of a bromide of an alkali metal, whereby silver bromide is formed with the dye adsorbed thereto.

3. The method of making a photographic emulsion that comprises the mixing in a gelatine solution of silver nitrate and a basic dye, and the addition thereto in excess of a potassium prussiate and of potassium bromide, whereby silver bromide is formed with the dye adsorbed thereto.

4. The method of making a photographic emulsion that comprises the mixing in a gelatine solution of silver nitrate and a basic dye, and the addition thereto in excess of a prussiate of an alkali metal and of a bromide of an alkali metal, whereby the silver bromide is formed with the dye adsorbed thereto, there being added during the process sufficient alkali to render the final emulsion alkaline.

5. The method of making a photographic emulsion that comprises the mixing in a gelatine solution of silver nitrate and a basic dye, and the transformation of the silver nitrate into a silver halogenide, the dye being capable of being adsorbed to the silver halogenide particles, there being added during the process sufficient alkali to render the final emulsion alkaline.

6. In the process of making a photographic emulsion that includes the precipitation in a suitable colloid of a silver halogenide, the step of exposing the colloid during such precipitation to light of a color to which the emulsion will be predominantly sensitive.

7. In the process of making a photographic emulsion that includes the precipitation in a suitable colloid of silver bromide in the presence of dye sensitizing the silver bromide predominantly for a certain color, the step of exposing the colloid during such precipitation to light of that same color.

JOHN G. CAPSTAFF.